United States Patent
Sato

(10) Patent No.: US 11,636,586 B2
(45) Date of Patent: Apr. 25, 2023

(54) PROCESS CONTROL SYSTEM AND PROCESS CONTROL METHOD

(71) Applicant: TOYOTA JIDOSHA KABUSHIKI KAISHA, Toyota (JP)

(72) Inventor: Shun Sato, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 342 days.

(21) Appl. No.: 16/991,604

(22) Filed: Aug. 12, 2020

(65) Prior Publication Data

US 2021/0065345 A1 Mar. 4, 2021

(30) Foreign Application Priority Data

Sep. 4, 2019 (JP) .............................. JP2019-161305

(51) Int. Cl.
*G06T 7/00* (2017.01)
*G05B 19/418* (2006.01)

(52) U.S. Cl.
CPC ........ *G06T 7/001* (2013.01); *G05B 19/41805* (2013.01); *G05B 19/41875* (2013.01)

(58) Field of Classification Search
CPC .......... G06T 7/001; G06T 2207/30164; G05B 19/41805; G05B 19/41875; G05B 2219/32181; Y02P 90/02; G06Q 10/06316; G06Q 50/04; G06K 9/6201

See application file for complete search history.

(56) References Cited

U.S. PATENT DOCUMENTS

| 2020/0013156 A1* | 1/2020 | Weiss ..................... G06V 10/40 |
| 2020/0233392 A1* | 7/2020 | Jonas ............... G05B 19/41875 |

FOREIGN PATENT DOCUMENTS

| JP | 2002-251212 A | 9/2002 |
| JP | 2002251212 A * | 9/2002 |
| JP | 2005-346655 A | 12/2005 |
| JP | 2010134642 A * | 6/2010 |
| JP | 5239797 B2 | 7/2013 |

* cited by examiner

*Primary Examiner* — Tarun Sinha
*Assistant Examiner* — Yossef Korang-Beheshti
(74) *Attorney, Agent, or Firm* — Sughrue Mion, PLLC

(57) ABSTRACT

The process control system converts, into images, time-varying waveforms of inspection data of an assembled product, parts, and sub-assembling processes that constitute the assembling process, performs matching between an inspection waveform image (IWI) of the assembled product and a predetermined deterioration pattern image (DPI), determines whether IWI of the assembled product is similar to DPI, performs, when IWI is similar to DPI, a first determination for performing matching between an IWI of each of sub-assembling processes and DPI and determining whether there is a sub-assembling process similar to DPI, performs, when there is a sub-assembling process similar to DPI in the first determination, a second determination for performing matching between IWI of each of parts assembled in the sub-assembling process similar to DPI and DPI and determining whether there is a part similar to DPI, and specifies a deterioration factor based on results of the first and second determinations.

5 Claims, 13 Drawing Sheets

PROCESS CONTROL SYSTEM AND PROCESS CONTROL METHOD

CROSS REFERENCE TO RELATED APPLICATIONS

This application is based upon and claims the benefit of priority from Japanese patent application No. 2019-161305, filed on Sep. 4, 2019, the disclosure of which is incorporated herein in its entirety by reference.

BACKGROUND

The present disclosure relates to a process control system and a process control method, and in particular, to a process control system and a process control method for controlling, using a computer, an assembling process for assembling a plurality of parts to manufacture an assembled product.

Normally, inspection data of an assembled product manufactured by assembling a plurality of parts is controlled by using a computer. Therefore, it is possible to learn, from a time-varying waveform of the inspection data of the assembled product, a tendency of a deviation from a standard. However, as factors (hereinafter referred to as "deterioration factors") of the tendency of the deviation from the standard vary, it is not easy to specify a deterioration factor.

Japanese Unexamined Patent Application Publication No. 2005-346655 discloses a process control method for specifying, when an anomaly has occurred in a process, the deterioration factor based on the similarity (i.e., the degree of similarity) between the time-varying waveform of the data of the process and the time-varying waveform of the past data.

SUMMARY

When the process control method disclosed in Japanese Unexamined Patent Application Publication No. 2005-346655 is applied to an assembled product, the deterioration factor is specified based on only the similarity between the time-varying waveform of the inspection data of the assembled product and the time-varying waveform of the past inspection data of the assembled product. In other words, as the parts assembled for the assembled product and the assembling process which the assembled product has undergone are not taken into consideration, it is impossible to accurately specify the deterioration factor.

The present disclosure has been made in view of the above-described circumstances and provides a process control system and a process control method that can more appropriately specify a deterioration factor of inspection data of an assembled product.

A first exemplary aspect is a process control system for controlling, using a computer, an assembling process for assembling a plurality of parts to manufacture an assembled product, the process control system being configured to:

convert, into an image, a time-varying waveform of each of inspection data of the assembled product, inspection data of the plurality of parts, and inspection data in a plurality of sub-assembling processes that constitute the assembling process;

perform matching between an inspection waveform image of the assembled product and a predetermined deterioration pattern image showing a tendency of a deviation from a standard and determine whether the inspection waveform image of the assembled product is similar to the deterioration pattern image;

perform, when the inspection waveform image of the assembled product is similar to the deterioration pattern image, a first determination for performing matching between an inspection waveform image of each of the plurality of sub-assembling processes and the deterioration pattern image and determining whether there is a sub-assembling process similar to the deterioration pattern image;

perform, when there is a sub-assembling process similar to the deterioration pattern image in the first determination, a second determination for performing matching between an inspection waveform image of each part assembled in the sub-assembling process similar to the deterioration pattern image and the deterioration pattern image and determining whether there is a part similar to the deterioration pattern image; and specify a deterioration factor of the inspection data of the assembled product based on results of the first and second determinations.

Another exemplary aspect is a process control method for controlling, using a computer, an assembling process for assembling a plurality of parts to manufacture an assembled product, the process control method including:

converting, into an image, a time-varying waveform of each of inspection data of the assembled product, inspection data of the plurality of parts, and inspection data in a plurality of sub-assembling processes that constitute the assembling process;

performing matching between an inspection waveform image of the assembled product and a predetermined deterioration pattern image showing a tendency of a deviation from a standard and determining whether the inspection waveform image of the assembled product is similar to the deterioration pattern image;

performing, when the inspection waveform image of the assembled product is similar to the deterioration pattern image, a first determination for performing matching between an inspection waveform image of each of the plurality of sub-assembling processes and the deterioration pattern image and determining whether there is a sub-assembling process similar to the deterioration pattern image;

performing, when there is a sub-assembling process similar to the deterioration pattern image in the first determination, a second determination for performing matching between an inspection waveform image of each part assembled in the sub-assembling process similar to the deterioration pattern image and the deterioration pattern image and determining whether there is a part similar to the deterioration pattern image; and specifying a deterioration factor of the inspection data of the assembled product based on results of the first and second determinations.

As described above, in the exemplary aspect of the present disclosure, a first determination for performing matching between an inspection waveform image of a plurality of sub-assembling processes and a deterioration pattern image and determining whether there is a sub-assembling process similar to the deterioration pattern image is performed, and when it is determined that there is a sub-assembling process similar to the deterioration pattern image in the first determination, a second determination for performing matching between an inspection waveform image of each of the parts assembled in the sub-assembling process similar to the deterioration pattern image and the deterioration pattern image and determining whether there is a part similar to the deterioration pattern image is performed.

Then, a deterioration factor of the inspection data of the assembled product is specified based on results of the first and second determinations. That is, a deterioration factor is specified by using not only the inspection waveform image of the assembled product but also the inspection waveform images of the sub-assembling processes and the parts assembled in the sub-assembling processes. Thus, it is possible to specify a deterioration factor of the inspection data of the assembled product more appropriately than when a deterioration factor is specified by performing matching only between the inspection waveform images of the assembled product.

When there is no sub-assembling process similar to the deterioration pattern image in the first determination, an inspection facility for the assembled product may be specified as the deterioration factor. Further, when there is a part similar to the deterioration pattern image in the second determination, a production facility for the part similar to the deterioration pattern image may be specified as the deterioration factor. In this way, it is possible to more appropriately specify a deterioration factor of the inspection data of the assembled product.

The deterioration pattern image may include a first pattern in which an amount of a deviation from a standard median value of a result of an inspection monotonously increases, and a second pattern in which an amplitude centered at the standard median value of the result of the inspection increases. By such a configuration, it is possible to further appropriately specify a deterioration factor.

For example, when the inspection waveform image of the assembled product is similar to the first pattern and there is no part similar to the deterioration pattern image in the second determination, an inspection facility for the sub-assembling process similar to the first pattern may be specified as the deterioration factor, and when the inspection waveform image of the assembled product is similar to the second pattern and there is no part similar to the deterioration pattern image in the second determination, an assembling procedure in the sub-assembling process similar to the second pattern may be specified as the deterioration factor.

According to the present disclosure, it is possible to provide a process control system and a process control method that can more appropriately specify a deterioration factor of inspection data of an assembled product.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be explained hereinafter in detail with reference to the drawings. However, the present disclosure is not limited to the embodiments shown below. Further, for the clarification of the explanation, the following descriptions and the drawings are simplified as appropriate.

First Embodiment

<Process Control System>

Figure 1:
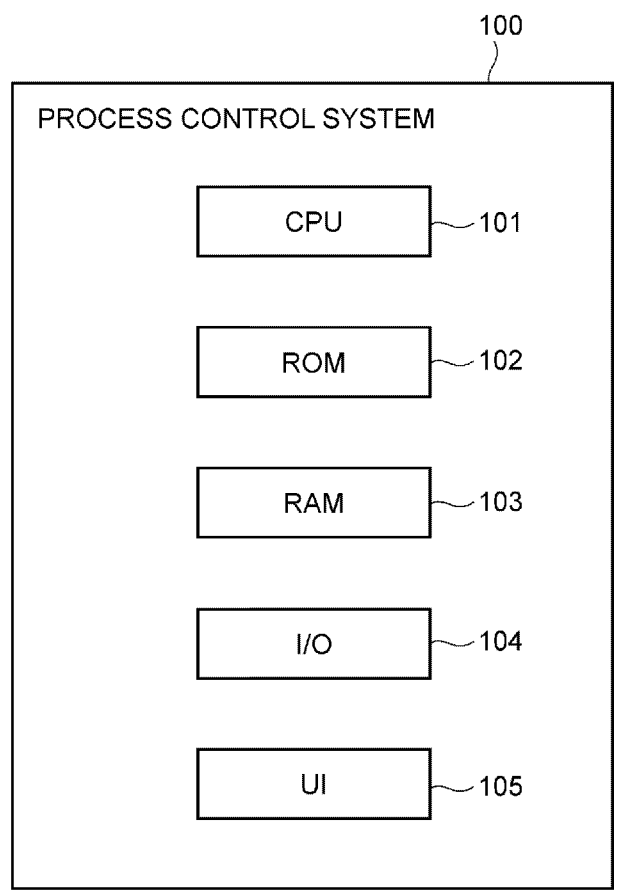
FIG. 1 is a diagram showing an example of a hardware configuration of a process control system according to a first embodiment.
Figure 2:
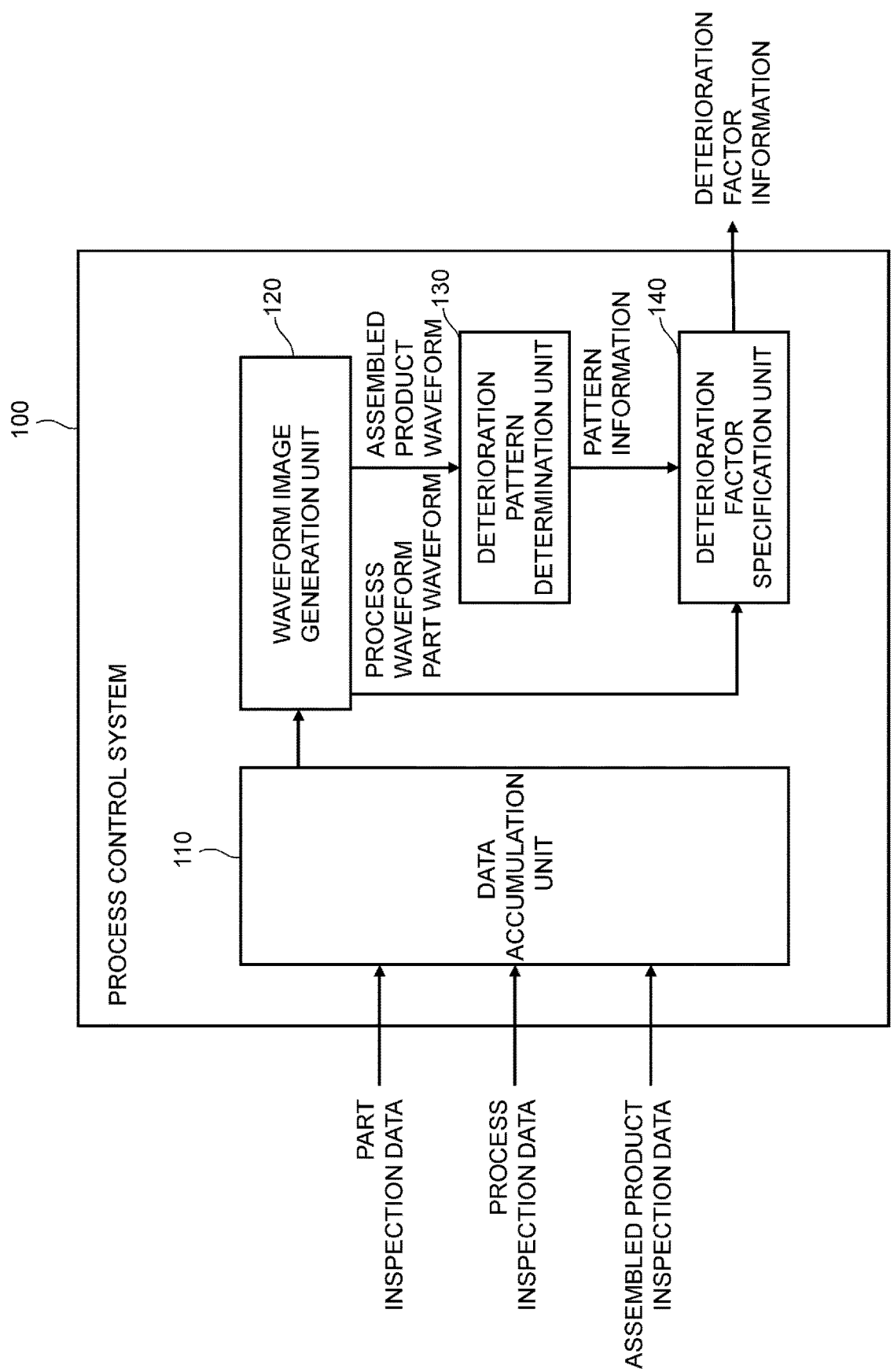
FIG. 2 is a functional block diagram of the process control system according to the first embodiment.

First, a configuration of a process control system according to a first embodiment is described with reference to FIGS. 1 and 2. FIG. 1 is a diagram showing an example of a hardware configuration of the process control system according to the first embodiment. Further, FIG. 2 is a functional block diagram of the process control system according to the first embodiment. A process control system 100 is a process control system for controlling, by using a computer, an assembling process for assembling a plurality of parts to manufacture an assembled product. That is, the process control system 100 functions as a computer.

The process control system 100 is, for example, a control apparatus installed in a monitoring room or the like of a factory in which an assembling process is performed. The assembling process includes a plurality of sub-assembling processes, and an inspection is performed in each of the sub-assembling processes. The assembling process is, for example, an assembling process of an automobile, but it is not limited to a particular assembling process.

As shown in FIG. 1, the process control system 100 includes, as hardware, a Central Processing Unit (CPU) 101, a Read Only Memory (ROM) 102, a Random Access Memory (RAM) 103, an Input/Output (I/O) 104, and a User Interface (UI) 105.

The CPU 101 performs, for example, control processing and arithmetic processing.

The ROM 102 stores, for example, a control program and an arithmetic program executed by the CPU 101.

The RAM 103 temporarily stores processing data and the like.

The I/O 104 is an input and output apparatus that receives data and signals from the outside and outputs data and signals to the outside.

The UI 105 includes an input device such as a keyboard and an output device such as a display. Note that the UI 105 may be configured as a touch panel formed by integrating an input device with an output device As shown in FIG. 2, the process control system 100 includes a data accumulation unit 110, a waveform image generation unit 120, a deterioration pattern determination unit 130, and a deterioration factor specification unit 140.

Part inspection data, process inspection data, and assembled product inspection data, which are received from the outside, are accumulated in the data accumulation unit 110. The data accumulation unit 110 includes, for example, the ROM 102, the RAM 103, or a hard disk (not shown) shown in FIG. 1.

In this example, the part inspection data is inspection data of each part constituting an assembled product. The part inspection data of the part manufactured in a company is transmitted to the data accumulation unit 110 of the process control system 100 from, for example, another factory in the company. Further, the part inspection data of the purchased part is transmitted to the data accumulation unit 110 of the process control system 100 from, for example, the supplier. Alternatively, the part inspection data may be stored in the data accumulation unit 110 by an operator inputting the part inspection data.

The process inspection data is inspection data in each of the sub-assembling processes. The process inspection data is transmitted to the data accumulation unit 110 of the process control system 100 from, for example, an inspection apparatus provided in each of the sub-assembling processes.

The assembled product inspection data is inspection data of an assembled product. If the assembled product is an automobile, the assembled product inspection data is all sorts of inspection data including, for example, wheel alignment. The assembled product inspection data is transmitted to the data accumulation unit 110 of the process control system 100 from, for example, an assembled product inspection apparatus.

Note that there is no limitation on a method for inputting and transmitting part inspection data, process inspection data, and assembled product inspection data to the data accumulation unit 110 and the above-described method therefor is merely an example.

The waveform image generation unit 120 converts the time-varying waveforms of the part inspection data, the process inspection data, and the assembled product inspection data that are stored in the data accumulation unit 110 into images and outputs the images. The image-converted data is deleted and only images are stored, whereby the number of items stored in the data accumulation unit 110 can be reduced. In FIG. 2, the inspection waveform image of an assembled product is simply shown as an "assembled product waveform", the inspection waveform image of a sub-assembling process is simply shown as a "process waveform", and the inspection waveform image of a part is simply shown as a "part waveform".

More specifically, the waveform image generation unit 120 generates a graph in which the horizontal axis indicates time and the vertical axis indicates an inspection result and converts the graph into an image. The unit of the horizontal axis of the graph is, for example, a "day", a "week", or a "month".

Further, in regard to each of the part inspection data, the process inspection data, and the assembled product inspection data, inspection results averaged at time intervals different from each other such as a "day", a "week", or a "month" may be graphed separately. For example, three graphs are generated: a graph of a daily average value in which the horizontal axis indicates the unit of a day and the vertical axis indicates measurement results; a graph of a weekly average value in which the horizontal axis indicates the unit of a week and the vertical axis indicates measurement results; and a graph of a monthly average value in which the horizontal axis indicates the unit of a month and the vertical axis indicates measurement results. By performing matching using graphs of the inspection results averaged at time intervals different from each other, it is possible to more appropriately specify a deterioration factor.

The deterioration pattern determination unit 130 performs matching between an inspection waveform image of the assembled product generated by the waveform image generation unit 120 and a predetermined deterioration pattern image showing a tendency of a deviation from the standard and determines whether the inspection waveform image of the assembled product is similar to the deterioration pattern image. Specifically, the deterioration pattern determination unit 130 calculates a similarity between the inspection waveform image and the deterioration pattern image of the assembled product by performing matching. If the calculated similarity is equal to or greater than a predetermined threshold, the deterioration pattern determination unit 130 determines that the above two images are similar to each other.

The threshold of the above similarity is set to, for example, 40 to 80% although it can be set as appropriate. In other words, if the similarity is less than 40%, it is usually determined that neither of the above two images are similar to each other, and if the similarity is 80% or more, it is determined that the two images are similar to each other. The deterioration pattern image is a template image for matching, and the similarity can be calculated by using a general-purpose method such as template matching.

Note that details of the deterioration pattern image such as a specific example thereof will be described later.

When the deterioration pattern determination unit 130 determines that the inspection waveform image of the assembled product is similar to the predetermined deterioration pattern image, the deterioration pattern determination unit 130 outputs that deterioration pattern image to the deterioration factor specification unit 140 as pattern information. That is, as the inspection waveform of the assembled product shows a tendency of a deviation from the standard, the deterioration factor specification unit 140 specifies a deterioration factor.

On the other hand, when the deterioration pattern determination unit 130 determines that the inspection waveform image of the assembled product is not similar to the predetermined deterioration pattern image, the deterioration pattern determination unit 130 does not output pattern information. In this case, the inspection waveform of the assembled product shows no deviation from the standard and thus is normal. Therefore, it is not necessary for the deterioration factor specification unit 140 to specify a deterioration factor.

The deterioration factor specification unit 140 performs matching between the deterioration pattern image (the pattern information in FIG. 2) similar to the inspection waveform image of the assembled product and each of the inspection waveform images of the process inspection data and the part inspection data generated by the waveform image generation unit 120 and specifies a deterioration factor. Then, the deterioration factor specification unit 140 outputs the specified deterioration factor to the outside of the process control system 100 as deterioration factor information.

This configuration enables a user of the process control system 100 to acquire deterioration factor information. For example, the deterioration factor information is transmitted to a Personal Computer (PC) owned by an engineer who designs and manages the assembling process and an operator who assembles parts in the assembling process.

Note that each of the waveform image generation unit 120, the deterioration pattern determination unit 130, and the deterioration factor specification unit 140 can be implemented by the CPU 101 executing a program stored in the ROM 102. Alternatively, each of these units may be implemented by hardware such as an electronic circuit.

Further, each functional block of the process control system 100 shown in FIG. 2 may be implemented by apparatuses different from each other. That is, the process control system 100 does not need to be configured by one control apparatus and thus may be configured by a plurality of apparatuses.

As described above, the process control system according to the first embodiment performs matching between the deterioration pattern image similar to the inspection waveform image of the assembled product and the inspection waveform images of the sub-assembling processes and the parts assembled in the sub-assembling processes and specifies a deterioration factor. That is, a deterioration factor is specified by performing matching using not only the inspection waveform image of the assembled product but also the inspection waveform images of the sub-assembling processes and the parts assembled in the sub-assembling processes. Thus, it is possible to specify a deterioration factor of the inspection data of the assembled product more appropriately than when a deterioration factor is specified by performing matching only using the inspection waveform images of the assembled product.

<Process Control Method>

Figure 3:
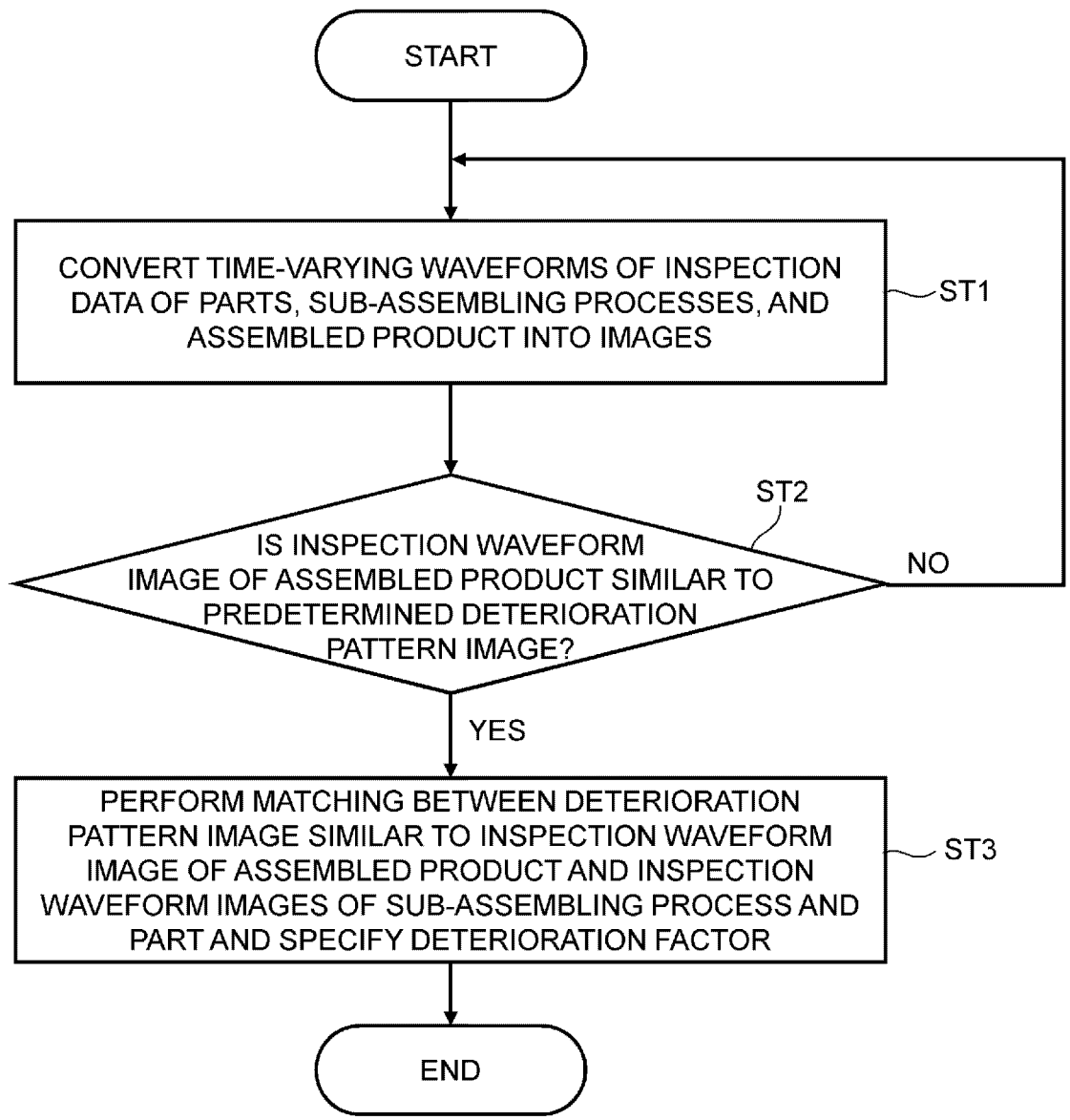
FIG. 3 is a flowchart showing a process control method according to the first embodiment.

Next, a process control method according to the first embodiment is described with reference to FIG. 3. FIG. 3 is a flowchart showing a process control method according to the first embodiment. The process control method according to the first embodiment is performed by the process control system according to the first embodiment.

First, as shown in FIG. 3, the waveform image generation unit 120 converts, into images, the time-varying waveforms of the part inspection data, the process inspection data, and the assembled product inspection data that are stored in the data accumulation unit 110 (Step ST1).

Next, the deterioration pattern determination unit 130 performs matching between the inspection waveform image of the assembled product generated by the waveform image generation unit 120 and the deterioration pattern image, and determines whether the inspection waveform image of the assembled product is similar to the deterioration pattern image (Step ST2).

Figure 4:
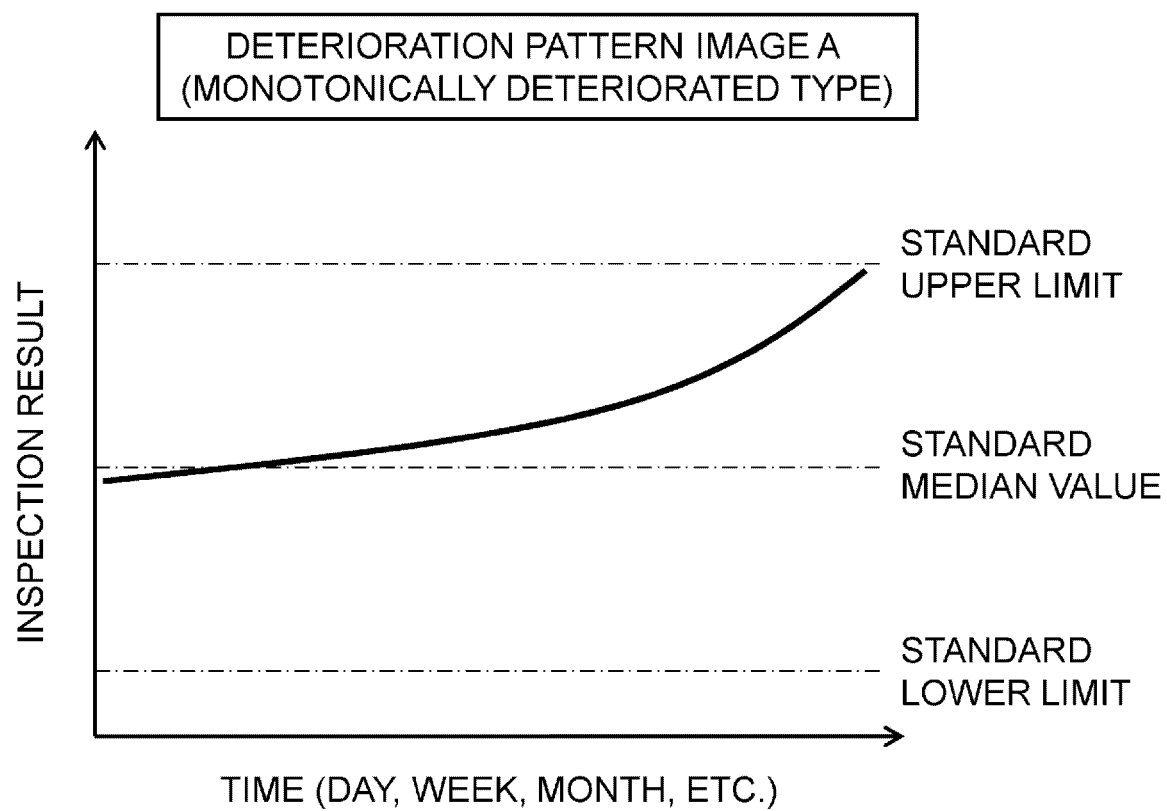
FIG. 4 shows a deterioration pattern image A which is a template image used for matching.
Figure 5:
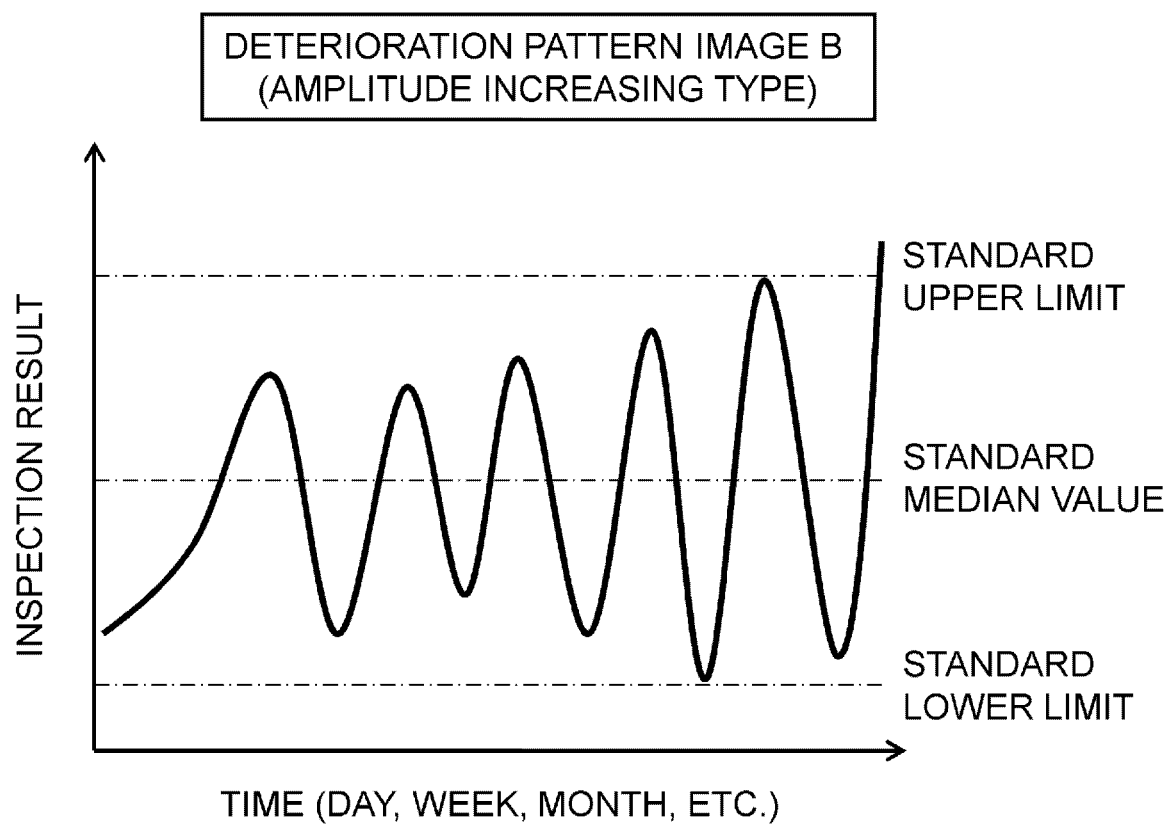
FIG. 5 shows a deterioration pattern image B which is a template image used for matching.
Figure 6:
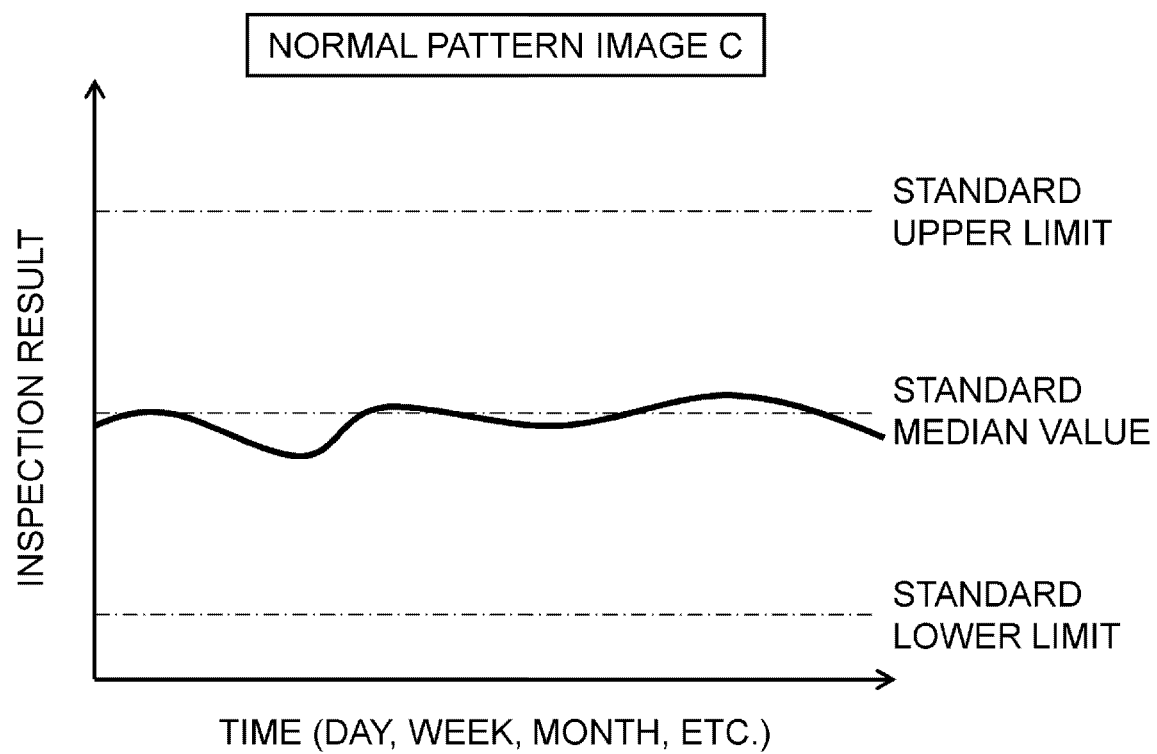
FIG. 6 shows a normal pattern image C which is a template image used for matching.

FIG. 4 is a diagram showing a deterioration pattern image A which is a template image used for matching. FIG. 5 shows a deterioration pattern image B which is a template image used for matching. FIG. 6 shows a normal pattern image C which is a template image used for matching.

Template images having horizontal axes different from each other, the horizontal axis indicating a day, a week, a month, or the like, may be prepared like in the case of the inspection waveform images of the assembled product inspection data or the like. As a matter of course, matching is performed between images having the same horizontal axis unit as each other.

The deterioration pattern image A (a first pattern) shown in FIG. 4 is a monotonically deteriorated type in which the amount of the deviation from a standard median value (a target value) of the inspection result increases monotonically. In such a deterioration pattern, a deterioration factor caused by a machine is suspected rather than an artificial deterioration factor.

The deterioration pattern image B (a second pattern) shown in FIG. 5 is an amplitude increasing type in which an amplitude around the standard median value (the target value) of the inspection result increases. In such a deterioration pattern, an artificial deterioration factor is suspected rather than a deterioration factor caused by a machine.

In the normal pattern image C shown in FIG. 6, the inspection result falls within the standard range (between the standard lower and upper limits).

Figure 7:
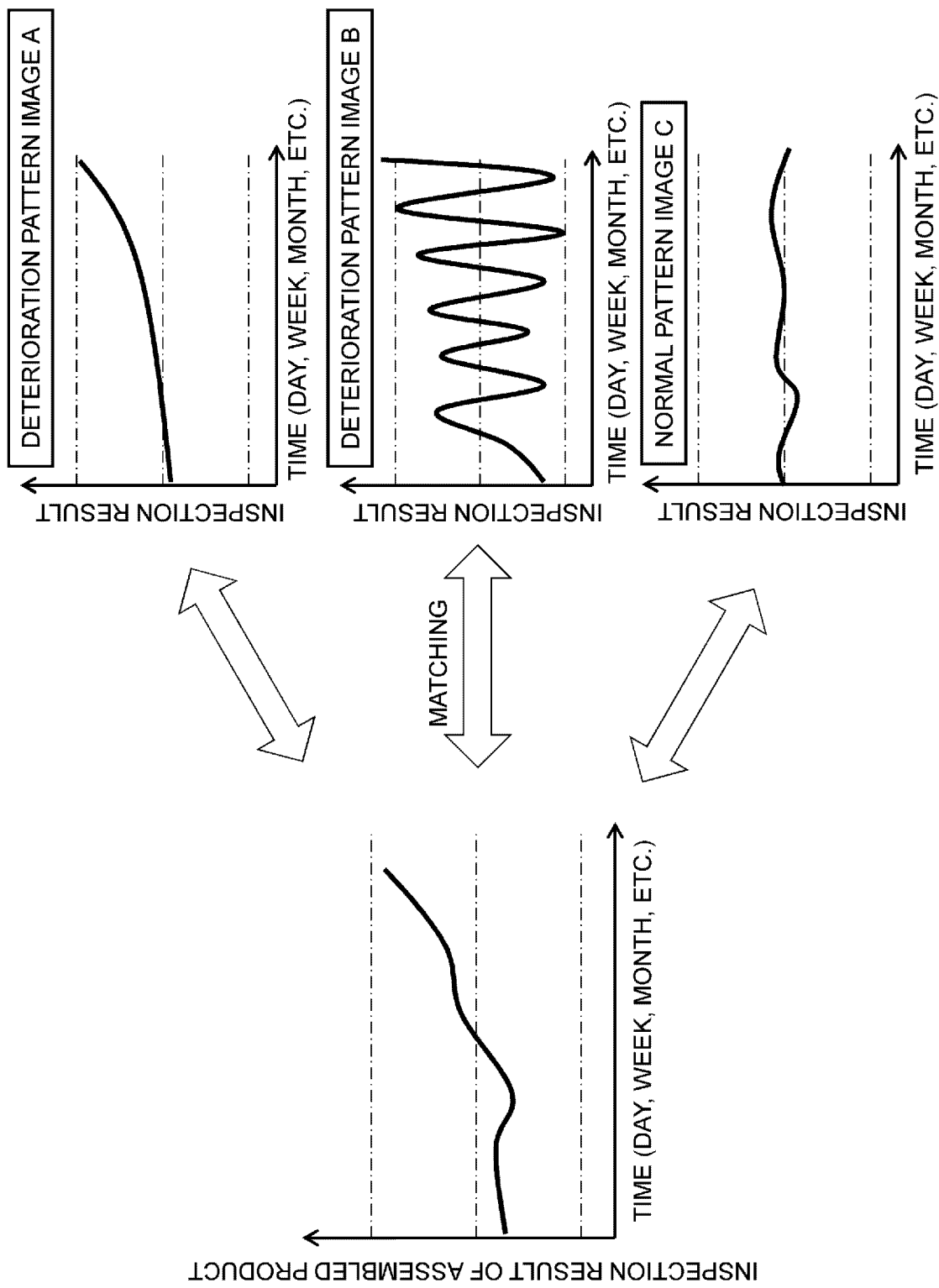
FIG. 7 is a schematic diagram showing matching performed in Step ST2.

FIG. 7 is a schematic diagram showing matching performed in Step ST2. As shown in FIG. 7, the deterioration pattern determination unit 130 performs matching between the inspection waveform image of the assembled product and each of the deterioration pattern images A and B and the normal pattern image C. If the deterioration pattern determination unit 130 determines that the inspection waveform image of the assembled product is similar to one of the deterioration pattern images A and B (YES in Step ST2), the deterioration pattern determination unit 130 outputs the deterioration pattern image to the deterioration factor specification unit 140 as pattern information. Then, the deterioration factor specification unit 140 performs matching between the deterioration pattern image and each of the inspection waveform images of the process inspection data and the part inspection data that are generated by the waveform image generation unit 120 and specifies a deterioration factor (Step ST3).

On the other hand, if the deterioration pattern determination unit 130 determines that the inspection waveform image of the assembled product is similar to neither of the deterioration pattern images A and B but is similar to the normal pattern image C (NO in Step ST2), the deterioration pattern determination unit 130 does not output pattern information. In this case, as the inspection waveform of the assembled product is normal and thus Step ST3 for the deterioration factor specification unit 140 specifying a deterioration factor becomes unnecessary, the process returns to Step ST1 as shown in FIG. 3.

In Step ST2, if the normal pattern image C shown in FIG. 6 is not used and the inspection waveform image of the assembled product is similar to neither of the deterioration pattern images A and B, the deterioration pattern determination unit 130 may determine that the inspection waveform of the assembled product is normal.

Further, as details of Step ST3 differ depending on which one of the deterioration pattern images A and B the inspection waveform image of the assembled product is similar to, the details will be described below.

<Details of Method for Specifying Deterioration Factor>

Figure 8:
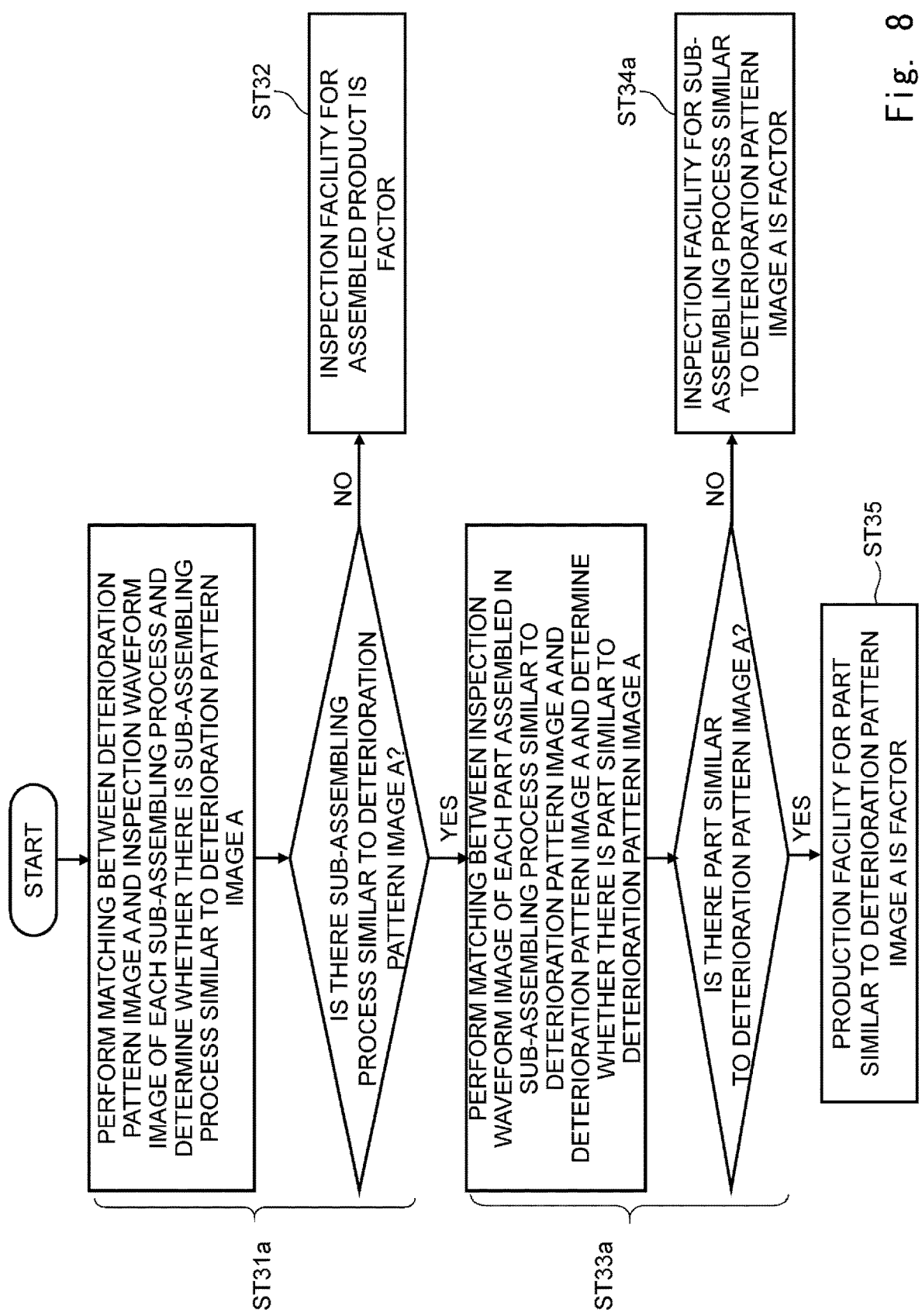
FIG. 8 is a flowchart showing details of Step ST3 in a case in which an inspection waveform image of an assembled product is similar to the deterioration pattern image A.
Figure 9:
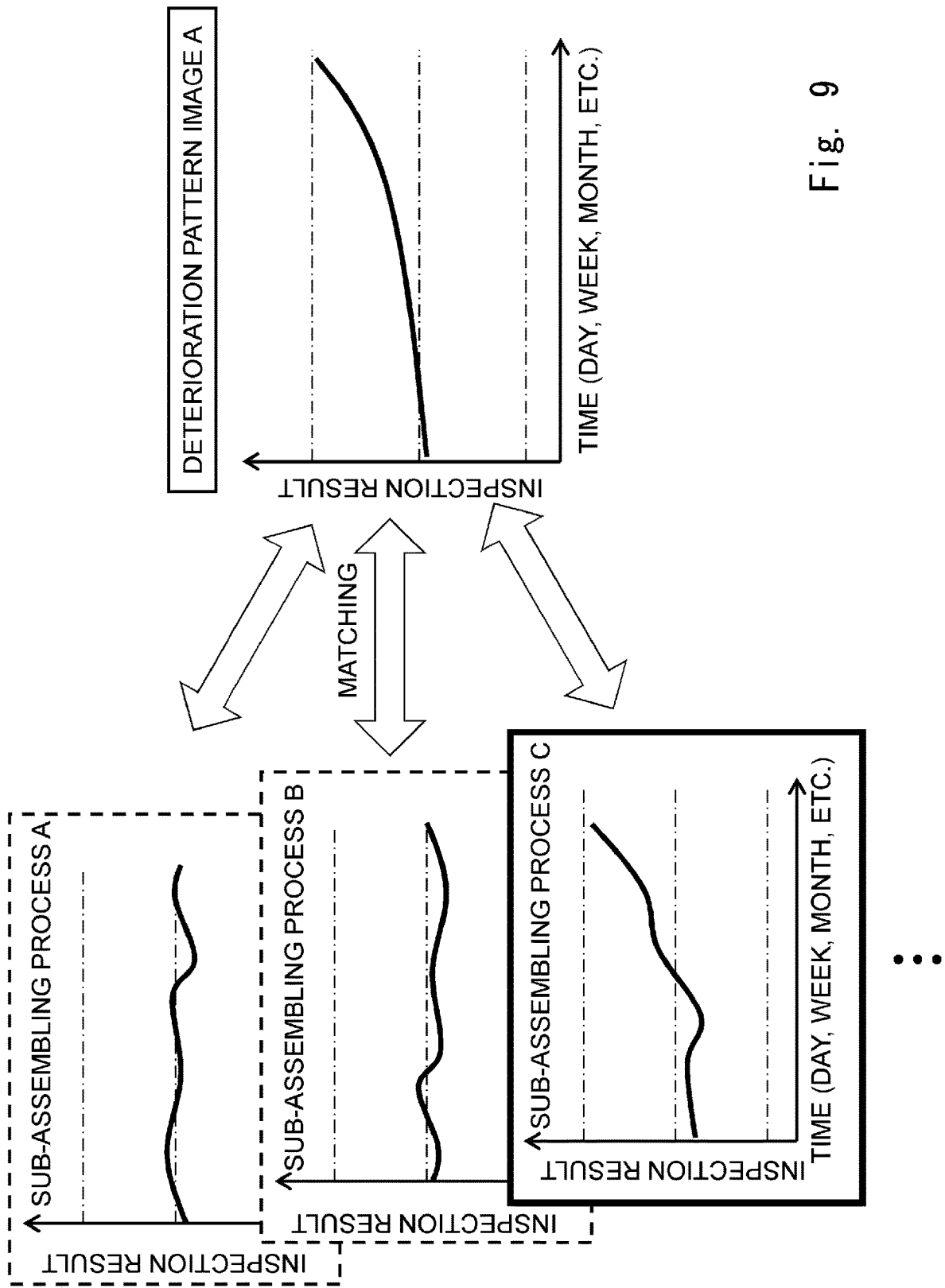
FIG. 9 is a schematic diagram showing matching performed in a first determination (Step ST31a)
Figure 10:
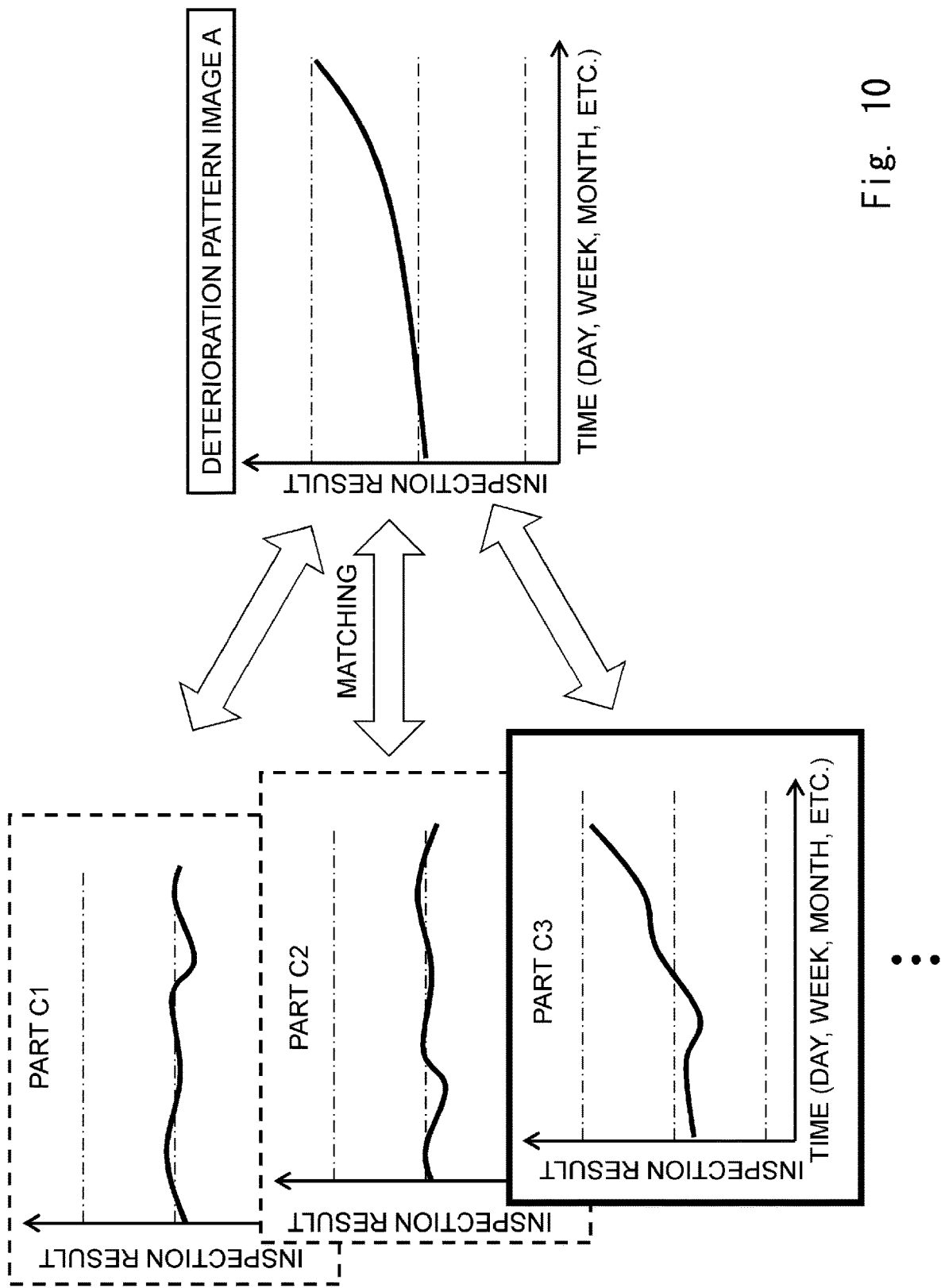
FIG. 10 is a schematic diagram showing matching performed in a second determination (Step ST33a)

Details of a method for specifying a deterioration factor in Step ST3 are described with reference to FIGS. 8 to 13. First, a case in which the inspection waveform image of the assembled product is similar to the deterioration pattern image A is described with reference to FIGS. 8 to 10. FIG. 8 is a flowchart showing the details of Step ST3 in a case in which the inspection waveform image of the assembled product is similar to the deterioration pattern image A. FIG. 9 is a schematic diagram showing matching performed in a first determination (Step ST31a). FIG. 10 is a schematic diagram showing matching performed in a second determination (Step ST33a).

As shown in FIG. 8, the deterioration factor specification unit 140 first performs matching between the deterioration pattern image A and the inspection waveform image of the process inspection data (inspection data in each sub-assembling process). Then, the deterioration factor specification unit 140 determines whether there is a sub-assembling process similar to the deterioration pattern image A (the first determination: Step ST31a).

In the example of FIG. 9, in the first determination, matching is performed between the deterioration pattern image A and each of the inspection waveform images of all sub-assembling processes A, B, C, and so on. In the example of FIG. 9, the inspection waveform image of the sub-assembling process C surrounded by a solid line is similar to the deterioration pattern image A as it has the highest similarity to the deterioration pattern image A. On the other hand, neither of the inspection waveform images of the sub-assembling processes A and B surrounded by broken lines are similar to the deterioration pattern image A.

If there is no sub-assembling process similar to the deterioration pattern image A in the first determination (NO in Step ST31a), which is a case different from the example of FIG. 9, it is considered that none of the sub-assembling processes are the deterioration factor of the assembled product. Accordingly, as shown in FIG. 8, the inspection facility for the assembled product is specified as the deterioration factor of the assembled product (Step ST32). On the basis of the aforementioned result, a user conducts, for example, an inspection and an investigation of the inspection facility.

On the other hand, if there is a sub-assembling process similar to the deterioration pattern image A in the first determination (YES in Step ST31a), the deterioration factor specification unit 140 performs matching between the inspection waveform image of the part assembled in the sub-assembling process having the highest similarity to the deterioration pattern image A and the deterioration pattern image A. Then, the deterioration factor specification unit 140 determines whether there is a part similar to the deterioration pattern image A (the second determination: Step ST33a).

In the example of FIG. 10, in the second determination, matching is performed between the deterioration pattern image A and each of the inspection waveform images of parts C1, C2, C3, and so on assembled in the sub-assembling process C having the highest similarity to the deterioration pattern image A in FIG. 9. In the example of FIG. 10, the inspection waveform image of the part C3 surrounded by a solid line is similar to the deterioration pattern image A as it has the highest similarity to the deterioration pattern image A. On the other hand, neither of the inspection waveform images of the parts C1 and C2 surrounded by broken lines are similar to the deterioration pattern image A.

If there is no part similar to the deterioration pattern image A in the second determination (NO in Step ST33a), which is a case different from the example of FIG. 10, it is considered that none of the parts are the deterioration factor of the assembled product. Accordingly, as shown in FIG. 8, the sub-assembling process (the sub-assembling process C in the example of FIG. 9) having the highest similarity to the deterioration pattern image A is considered to be the deterioration factor of the assembled product.

It should be noted that as the deterioration pattern image A is a monotonically deteriorated type, a deterioration factor caused by a machine is suspected rather than an artificial deterioration factor. Accordingly, the inspection facility is specified as the deterioration factor of the assembled product, instead of the assembling procedure in the sub-assembling process similar to the deterioration pattern image A (Step ST34a). On the basis of the aforementioned result, a user conducts, for example, an inspection and an investigation of the inspection facility in the corresponding sub-assembly process.

On the other hand, as in the example of FIG. 10, if there is a part similar to the deterioration pattern image A in the second determination (YES in Step ST33a), the production facility of the part is specified as the deterioration factor of the assembled product (Step ST35). On the basis of the aforementioned result, a user conducts, for example, an inspection and an investigation of the production facility sequentially from the part having a high similarity.

Figure 11:
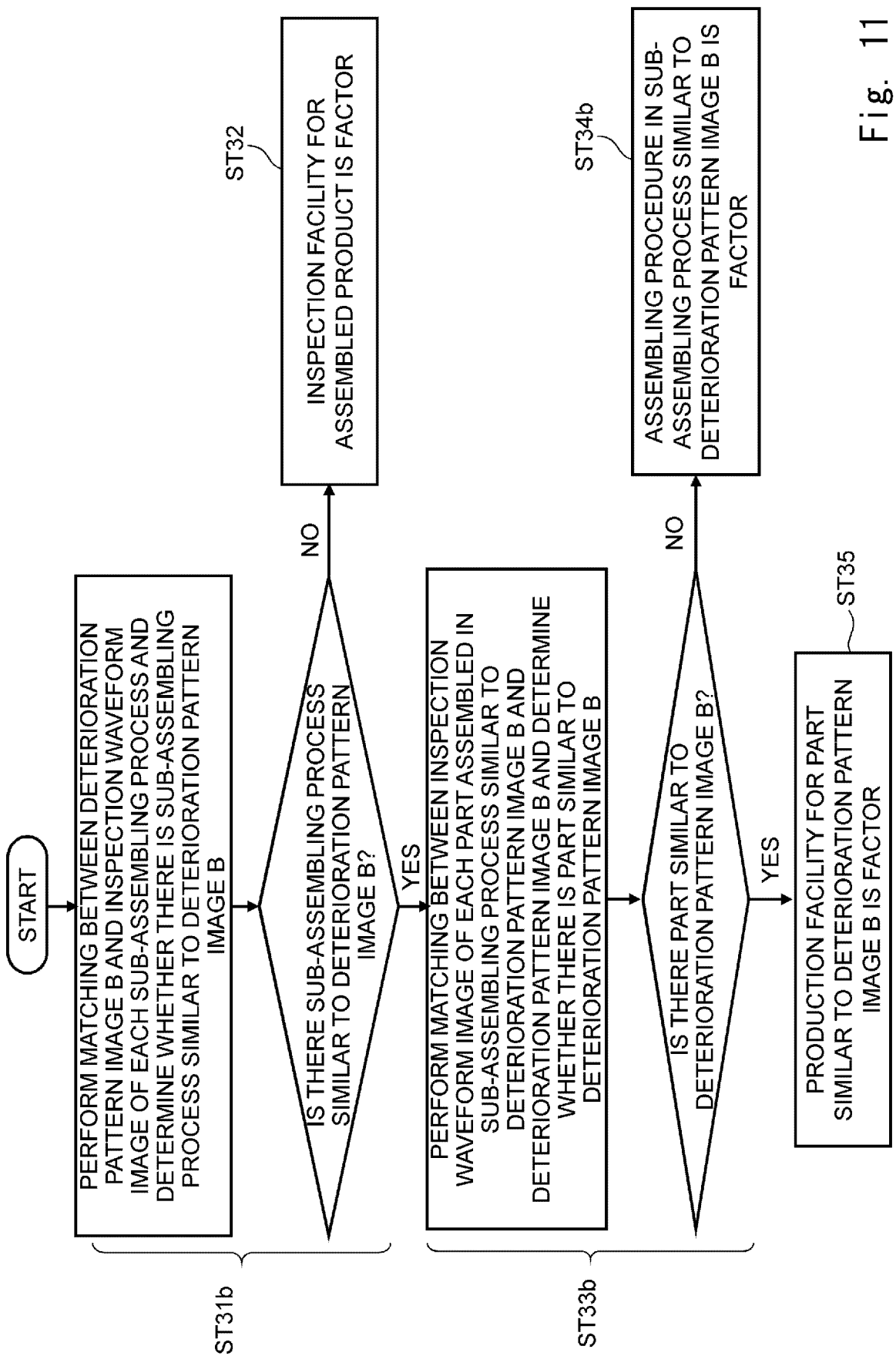
FIG. 11 is a flowchart showing details of Step ST3 in a case in which the inspection waveform image of the assembled product is similar to the deterioration pattern image B.
Figure 12:
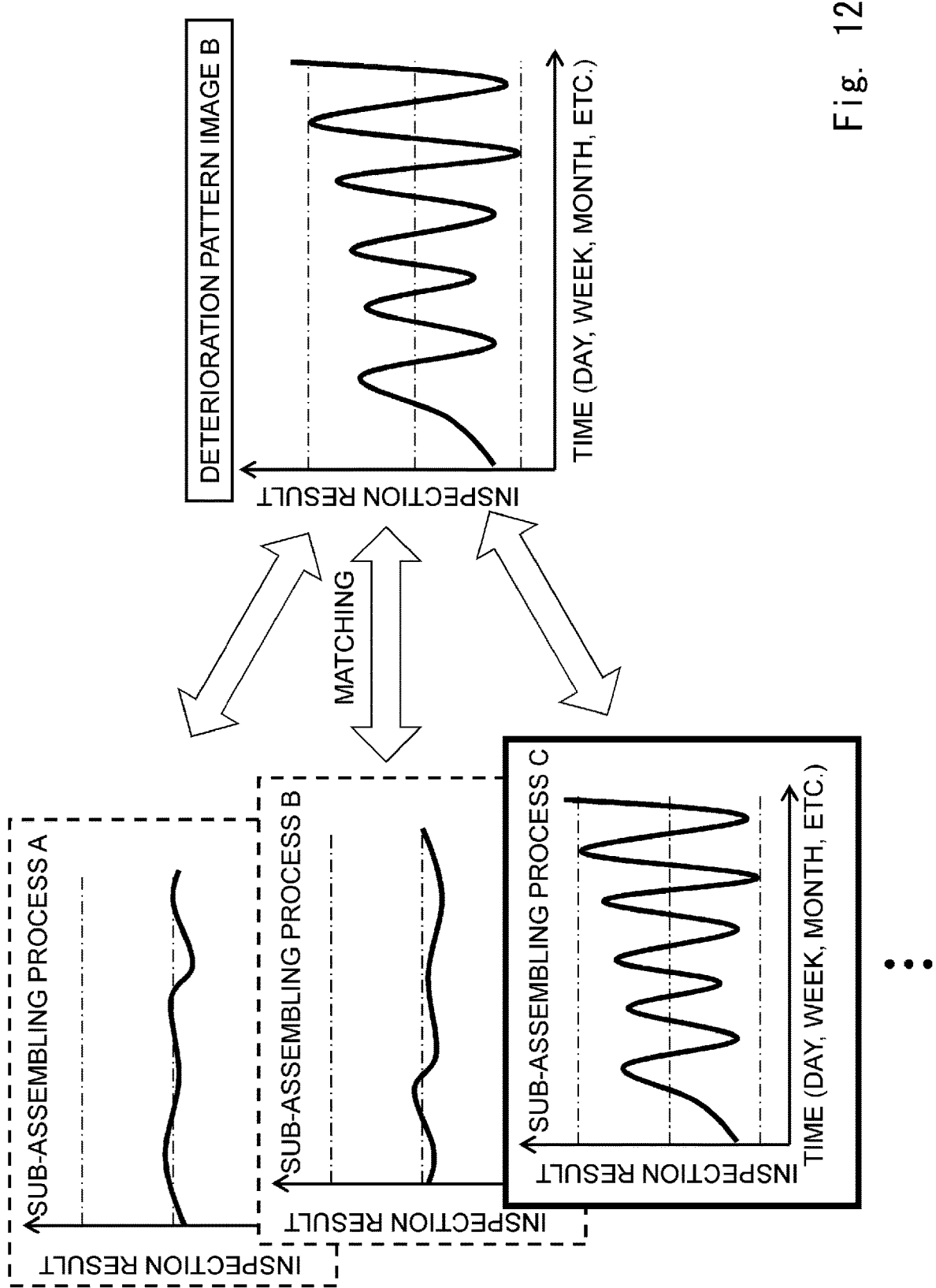
FIG. 12 is a schematic diagram showing matching performed in the first determination (Step ST31b)
Figure 13:
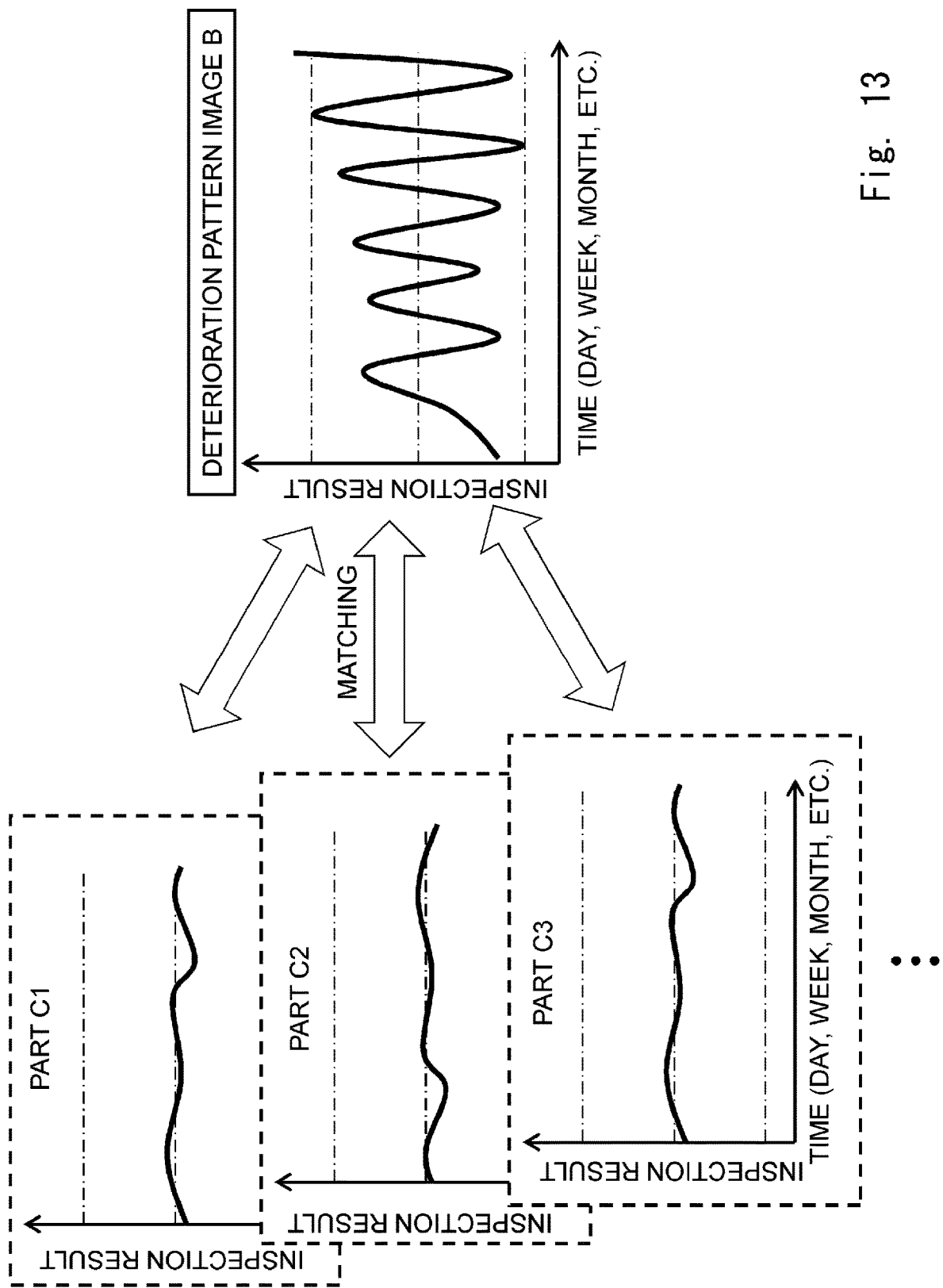
FIG. 13 is a schematic diagram showing matching performed in the second determination (Step ST33b).

Next, a case in which the inspection waveform image of the assembled product is similar to the deterioration pattern image B is described with reference to FIGS. 11 to 13. FIG. 11 is a flowchart showing the details of Step ST3 in a case in which the inspection waveform image of the assembled product is similar to the deterioration pattern image B. FIG. 12 is a schematic diagram showing matching performed in the first determination (Step ST31b). FIG. 13 is a schematic diagram showing matching performed in the second determination (Step ST33b).

As shown in FIG. 11, the deterioration factor specification unit 140 first performs matching between the deterioration pattern image B and the inspection waveform image of the process inspection data (inspection data in each sub-assembling process). Then, the deterioration factor specification unit 140 determines whether there is a sub-assembling process similar to the deterioration pattern image B (the first determination: Step ST31b).

In the example of FIG. 12, in the first determination, matching is performed between the deterioration pattern image B and each of the inspection waveform images of all the sub-assembling processes A, B, C, and so on. In the example of FIG. 12, the inspection waveform image of the sub-assembling process C surrounded by a solid line is similar to the deterioration pattern image B as it has the highest similarity to the deterioration pattern image B. On the other hand, neither of the inspection waveform images of the sub-assembling processes A and B surrounded by broken lines are similar to the deterioration pattern image B.

If there is no sub-assembling process similar to the deterioration pattern image B in the first determination (NO in Step ST31b), which is a case different from the example of FIG. 12, it is considered that none of the sub-assembling processes are the deterioration factor of the assembled product. Accordingly, as shown in FIG. 11, the inspection facility for the assembled product is specified as the deterioration factor of the assembled product as in the case of the deterioration pattern image A shown in FIG. 8 (Step ST32). On the basis of the aforementioned result, a user conducts, for example, an inspection and an investigation of the inspection facility.

On the other hand, as shown in the example of FIG. 12, if there is a sub-assembling process similar to the deterioration pattern image B in the first determination (YES in Step ST31b), the deterioration factor specification unit 140 performs matching between the inspection waveform image of the part assembled in the sub-assembling process having the highest similarity to the deterioration pattern image B and the deterioration pattern image B. Then, the deterioration factor specification unit 140 determines whether there is a part similar to the deterioration pattern image B (the second determination: Step ST33a).

In the example of FIG. 13, in the second determination, matching is performed between the deterioration pattern image B and each of the inspection waveform images of the parts C1, C2, C3, and so on assembled in the sub-assembling process C having the highest similarity to the deterioration pattern image B in FIG. 12. In the example of FIG. 13, none of the inspection waveform images of the parts C1, C2, C3, and so on surrounded by broken lines are similar to the deterioration pattern image B.

As shown in the example of FIG. 13, if there is no part similar to the deterioration pattern image B in the second determination (NO in Step ST33b), it is considered that none of the parts are the deterioration factor of the assembled product. Accordingly, as shown in FIG. 11, the sub-assembling process (the sub-assembling process C in the example of FIG. 12) having the highest similarity to the deterioration pattern image B is considered to be the deterioration factor of the assembled product.

It should be noted that as the deterioration pattern image B is an amplitude increasing type, an artificial deterioration factor is suspected rather than a deterioration factor caused by a machine. Accordingly, the assembling procedure in the sub-assembling process similar to the deterioration pattern image B is specified as the deterioration factor of the assembled product (Step ST34b). On the basis of the aforementioned result, a user conducts, for example, an inspection and an investigation of the assembling procedure in the corresponding sub-assembly process.

On the other hand, if there is a part similar to the deterioration pattern image B in the second determination (YES in Step ST33b), which is a case different from the example of FIG. 13, the production facility of the part is specified as the deterioration factor of the assembled product as in the case of the deterioration pattern image A shown in FIG. 8 (Step ST35). On the basis of the aforementioned result, a user conducts, for example, an inspection and an investigation of the production facility sequentially from the part having a high similarity.

As described above, in the process control method according to this embodiment, when the inspection waveform image of the assembled product is similar to the deterioration pattern image, matching is performed between the inspection waveform image of the sub-assembling processes and the deterioration pattern image and it is determined whether there is a sub-assembling process similar to the deterioration pattern image (the first determination). Further, when there is a sub-assembling process similar to the deterioration pattern image in the first determination, matching is performed between the inspection waveform image of each of the parts assembled in the sub-assembling process and the deterioration pattern image and it is determined whether there is a part similar to the deterioration pattern image (the second determination). Then, a deterioration factor is specified based on the results of the first and second determinations.

That is, in the process control method according to this embodiment, the deterioration factor is specified by using not only the inspection waveform image of the assembled product but also the inspection waveform images of the sub-assembling processes and the parts assembled in the sub-assembling processes. Thus, it is possible to specify a deterioration factor of the inspection data of the assembled product more appropriately than when a deterioration factor is specified by performing matching only between the inspection waveform images of the assembled product.

In the above-described example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A process control system for controlling, using a computer, an assembling process for assembling a plurality of parts to manufacture an assembled product, the process control system being configured to:

convert, into an image, a time-varying waveform of each of inspection data of the assembled product, inspection data of the plurality of parts, and inspection data in a plurality of sub-assembling processes that constitute the assembling process;

perform matching between an inspection waveform image of the assembled product and a predetermined deterioration pattern image showing a tendency of a deviation from a standard and determine whether the inspection waveform image of the assembled product is similar to the deterioration pattern image;

perform, when the inspection waveform image of the assembled product is similar to the deterioration pattern image, a first determination for performing matching between an inspection waveform image of each of the plurality of sub-assembling processes and the deterioration pattern image and determining whether there is a sub-assembling process similar to the deterioration pattern image;

perform, when there is a sub-assembling process similar to the deterioration pattern image in the first determination, a second determination for performing matching between an inspection waveform image of each part assembled in the sub-assembling process similar to the deterioration pattern image and the deterioration pattern image and determining whether there is a part similar to the deterioration pattern image; and specify a deterioration factor of the inspection data of the assembled product based on results of the first and second determinations, wherein, when (i) the inspection waveform image of the assembled product is similar to the deterioration pattern image, and (ii) there is no sub-assembling process similar to the deterioration pattern image in the first determination, an inspection facility for the assembled product is specified as the deterioration factor.

2. The process control system according to claim 1, wherein when there is a part similar to the deterioration pattern image in the second determination, a production facility for the part similar to the deterioration pattern image is specified as the deterioration factor.

3. The process control system according to claim 1, wherein the deterioration pattern image includes:
    a first pattern in which an amount of a deviation from a standard median value of a result of an inspection monotonously increases; and
    a second pattern in which an amplitude centered at the standard median value of the result of the inspection increases.

4. The process control system according to claim 3, wherein
    when the inspection waveform image of the assembled product is similar to the first pattern and there is no part similar to the deterioration pattern image in the second determination, an inspection facility for the sub-assembling process similar to the first pattern is specified as the deterioration factor, and
    when the inspection waveform image of the assembled product is similar to the second pattern and there is no part similar to the deterioration pattern image in the second determination, an assembling procedure in the sub-assembling process similar to the second pattern is specified as the deterioration factor.

5. A process control method for controlling, using a computer, an assembling process for assembling a plurality of parts to manufacture an assembled product, the process control method comprising:
    converting, into an image, a time-varying waveform of each of inspection data of the assembled product, inspection data of the plurality of parts, and inspection data in a plurality of sub-assembling processes that constitute the assembling process;
    performing matching between an inspection waveform image of the assembled product and a predetermined deterioration pattern image showing a tendency of a deviation from a standard and determining whether the inspection waveform image of the assembled product is similar to the deterioration pattern image;
    performing, when the inspection waveform image of the assembled product is similar to the deterioration pattern image, a first determination for performing matching between an inspection waveform image of each of the plurality of sub-assembling processes and the deterioration pattern image and determining whether there is a sub-assembling process similar to the deterioration pattern image;
    performing, when there is a sub-assembling process similar to the deterioration pattern image in the first determination, a second determination for performing matching between an inspection waveform image of each part assembled in the sub-assembling process similar to the deterioration pattern image and the deterioration pattern image and determining whether there is a part similar to the deterioration pattern image; and
    specifying a deterioration factor of the inspection data of the assembled product based on results of the first and second determinations,
    wherein, when (i) the inspection waveform image of the assembled product is similar to the deterioration pattern image, and (ii) there is no sub-assembling process similar to the deterioration pattern image in the first determination, an inspection facility for the assembled product is specified as the deterioration factor.

* * * * *